United States Patent
Fado et al.

(10) Patent No.: US 7,340,397 B2
(45) Date of Patent: Mar. 4, 2008

(54) SPEECH RECOGNITION OPTIMIZATION TOOL

(75) Inventors: Francis Fado, Highland Beach, FL (US); Peter J. Guasti, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 10/378,506

(22) Filed: Mar. 3, 2003

(65) Prior Publication Data

US 2004/0176952 A1 Sep. 9, 2004

(51) Int. Cl.
G10L 15/04 (2006.01)

(52) U.S. Cl. ............... 704/251; 704/243; 704/244; 704/226

(58) Field of Classification Search ......... 704/270, 704/276, 271, 260, 226, 225, 203, 205, 278, 704/251, 254, 243, 244
See application file for complete search history.

(56) References Cited

U.S. PATENT DOCUMENTS

| | | | |
|---|---|---|---|
| 3,965,309 A | 6/1976 | Dotter, Jr. | |
| 4,455,634 A | 6/1984 | Efron et al. | |
| 5,832,441 A * | 11/1998 | Aaron et al. | 704/276 |
| 5,983,185 A * | 11/1999 | Cuffaro et al. | 704/270 |
| 6,125,343 A | 9/2000 | Schuster | |
| 6,138,051 A | 10/2000 | Dieterich | |
| 6,336,091 B1 | 1/2002 | Polikaitis et al. | |
| 6,381,569 B1 | 4/2002 | Sih et al. | |
| 6,801,889 B2 * | 10/2004 | Walker | 704/226 |

OTHER PUBLICATIONS

Bradford W. Gillespie and Les E. Atlas, "Acoustic Diversity for Improved Speech Recognition in Reverberant Environments", Dept. of Electrical Engineering, Univ. of Washington.

* cited by examiner

*Primary Examiner*—Patrick N. Edouard
*Assistant Examiner*—Huyen X. Vo
(74) *Attorney, Agent, or Firm*—Akerman Senterfitt (57) ABSTRACT

A method of optimizing audio input for speech recognition applications can include identifying a source waveform and at least one optimization parameter, wherein the optimization parameter is configured to adjust audio input to a speech recognition application. The source waveform can be modified according to the optimization parameter resulting in a modified waveform. At least one optimization parameter can be synchronized with the source waveform. At least two time dependant graphs can be displayed, where the time dependant graphs can include the source waveform, the modified waveform, and/or a graph for the optimization parameter plotted against time.

14 Claims, 4 Drawing Sheets

SPEECH RECOGNITION OPTIMIZATION TOOL

BACKGROUND OF THE INVENTION

1. Technical Field

The present invention relates to the field of speech recognition and, more particularly, to input pre-filtering tools.

2. Description of the Related Art

In order to accurately produce textual outputs from speech inputs, speech recognition applications rely on quality audio inputs. Relatively slight imperfections in an audio input can result in significant inaccuracies in generated text. To improve the quality of audio speech inputs, voice recognition applications can perform pre-filtering operations that filter raw audio to minimize background or ambient noise while maximizing the speech component of an audio input. By performing speech-to-text conversions on filtered audio input instead of raw unfiltered input, substantially improved textual outputs can result.

Properly optimizing audio input for speech recognition tasks can be challenging, primarily due to the need to match optimization settings with the acoustic characteristics of an operational environment. Problematically, a wide variety of environments exist over which optimization routines must operate. Notably, environmental considerations can be based on audio hardware as well as acoustic characteristics of the environment in which a speech recognition application must operate. For example, the sensitivity and clarity of a microphone used to gather audio input can substantially affect resulting audio signals. Additionally, the background noise of an environment, which can range from a relative quiet room, to a noisy office, to loud traffic conditions, such as those found in airports, can dramatically affect audio inputs.

To account for vastly different environmental characteristics, audio pre-filtering applications can utilize a variety of optimization algorithms. Behavior of these optimization algorithms can generally be adjusted for specific environmental conditions through the use of configurable optimization parameters. Precisely tuning optimization parameters can be facilitated through optimization tools. Conventional optimization tools, however, suffer from numerous shortcomings.

For example, many of the most precise optimization tools and techniques can require expensive, resource intensive hardware that may be available within a laboratory setting but are not generally available in the field. Since evaluating the effectiveness of optimization parameters settings can require inputs only obtainable at a field location, such lab intensive tools can be ineffective as well as costly. Unfortunately, the optimization tools available at field locations generally do not allow technicians to synchronously compare an input signal, a resulting output signal, and adjustment details. Consequently, technicians often improperly adjust optimization parameters causing ambient noise components to be amplified or speech components to be removed from the audio input.

SUMMARY OF THE INVENTION

The invention disclosed herein provides a method and a system for optimizing audio inputs for voice recognition applications. In particular, the invention allows users to evaluate the effectiveness of speech input optimization parameters by displaying numerous audio waveforms and optimization parameters in a synchronous fashion. Accordingly, optimization parameters can be precisely adjusted for a particular environment. For example, in one embodiment, an optimization tool can display relevant optimization information within an interactive graphical user interface (GUI). The relevant optimization information can include a source waveform, a modified waveform, an ambient waveform representing removed ambient noise, and graphs showing optimization parameters and optimization algorithm variables plotted against time. Notably, such an optimization tool can function within a multitude of environments including potentially low-resource hardware platforms, such as those that typically exist at field locations.

One aspect of the present invention can include a method of optimizing audio input for speech recognition applications. The method can include identifying a source waveform and at least one optimization parameter, wherein the optimization parameter is configured to adjust audio input used by a speech recognition application. The source waveform can be modified according to the optimization parameter resulting in a modified waveform. In one embodiment, the source waveform can have a model waveform associated which represents an ideal, post-edited waveform. In such an embodiment, the modified waveform can be compared to the model waveform. Further, at least one suggested optimization parameter can be provided based upon differences between the modified waveform and the model waveform. In one embodiment, modifying the source waveform can result in the generation of an ambient waveform, wherein the source waveform is the sum of the modified waveform and the ambient waveform. The ambient waveform can represent the removed waveform components that are believed to be ambient noise. The source waveform can include speech.

Additionally, at least one algorithm that utilizes the optimization parameters can be executed in order to modify the source waveform. The algorithm can include at least one algorithm variable. An algorithm waveform can be constructed by plotting at least one algorithm variable against time. The algorithm waveform can be synchronized with the source waveform. Further, the source waveform and the algorithm waveform can be simultaneously displayed. In one embodiment, a debugging window for tracing at least one of the algorithm variables through source code of the algorithm can be displayed. Moreover, the debugging windows can be synchronized with the displayed source waveform and algorithm waveform.

At least one optimization parameter can be synchronized with the source waveform. Additionally, at least two time dependant graphs can be displayed simultaneously. For example, a GUI can be used to display selective graphs. At least two of these graphs can be selected from among the source waveform, the modified waveform, the ambient waveform, and a graph for the optimization parameter plotted against time. In one embodiment, the time span for one of the displayed graphs can be altered responsive to an input from a user of the GUI. If the optimization parameter graph is modified within the GUI, the source waveform can be modified according to new optimization parameters resulting in a new modified waveform.

Another aspect of the present invention can include a system for optimizing input for speech recognition applications. The system can include an audio input device containing at least one adjustable input parameter, wherein the audio input device is configured to receive audio input for a speech recognition application. The optimization parameter can improve total harmonic distortion and noise (THD+N) or signal-to-noise-ratio for the speech recognition application. The system can also include a signal editor configured to modify a source waveform by adjusting at least one of the input parameters. Additionally, an ambient waveform can be generated by the signal editor, wherein the source waveform is the sum of the ambient waveform and the modified waveform.

The system can also include a means for converting each of the adjustable input parameters into a parameter waveform, wherein the parameter waveform is a mathematical representation of the value of a selected one of the input parameters plotted against time. The parameter waveform can be synchronized with the source waveform and/or the modified waveform. In one embodiment, the signal editor can further include at least one optimization algorithm used to modify the source waveform. The optimization algorithm can include at least one algorithm variable which can be converted into an algorithm waveform by plotting the algorithm variable against time. The algorithm waveform can be synchronized with the source waveform. A means for simultaneously displaying the parameter waveform, the source waveform, the modified waveform, the ambient waveform, and/or the algorithm waveform can be provided. The displaying means can include or be included within a sound editing software application.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for adjusting optimization parameters used in conjunction with a speech recognition application. More particularly, the invention allows users to evaluate the effectiveness of speech input optimization parameters by displaying numerous waveforms and associated parameters in a synchronous fashion. Displayed waveforms can include, but are not limited to, a source waveform, an ambient waveform, and a modified waveform. These waveforms can represent a source signal, a filtered signal representing ambient noise, and an edited signal representing a speech signal. Displayed optimization parameters can include, but are not limited to, signal gain, signal filter parameters, and variable values utilized within optimization algorithms.

Figure 1:
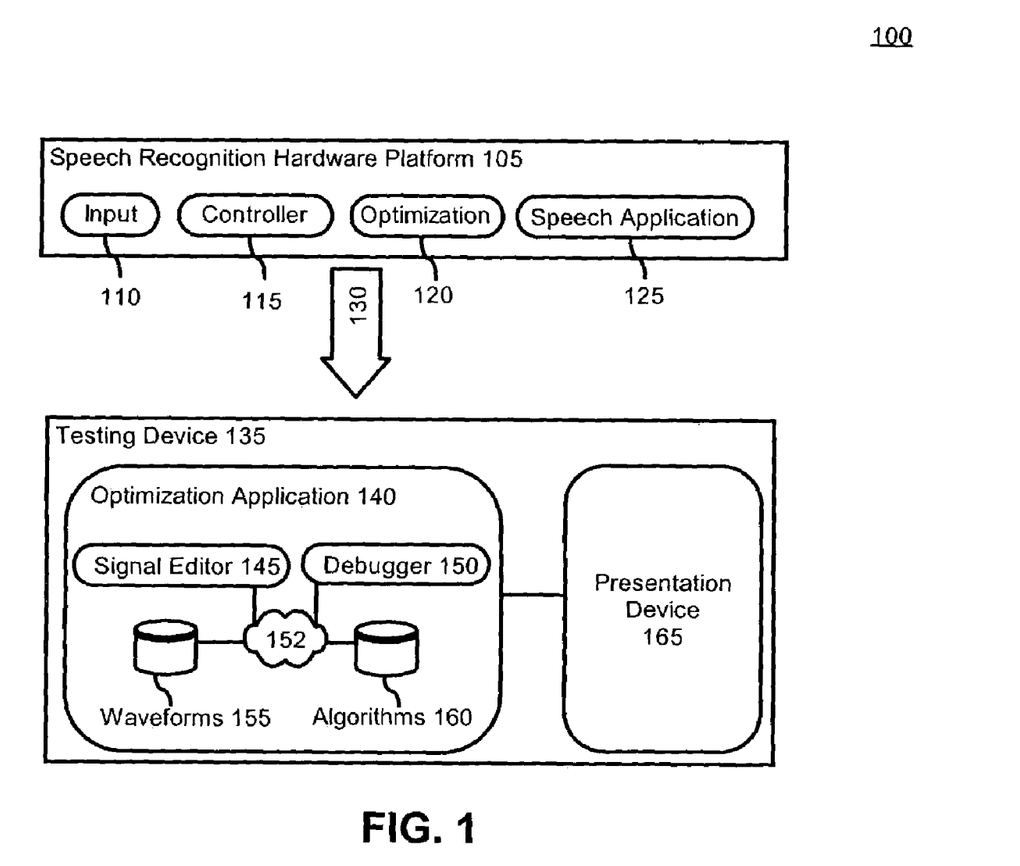
FIG. 1 is a schematic diagram illustrating an exemplary system for optimizing parameters that enhance audio input for speech recognition applications in accordance with the inventive arrangements disclosed herein.

FIG. 1 is a schematic diagram illustrating an exemplary system 100 for optimizing parameters that enhance audio input for speech recognition applications in accordance with the inventive arrangements disclosed herein. The system 100 can include a speech recognition hardware platform 105, a testing device 135, an optimization application 140, a signal editor 145, and a debugger 150. The speech recognition hardware platform 105 can be the platform within which a speech recognition application 125 operates that includes the audio environment in which an input device 110, such as a microphone, is disposed. The speech recognition hardware platform 105 can include, but is not limited to, a personal computer and associated equipment, components within a distributed network, a mobile computing platform, and/or an integrated device that performs speech recognition functions. For example, the speech recognition hardware platform 105 can be a personal data assistant with dictation and transcription features. Alternatively, the speech recognition hardware platform 105 can be a cellular telephone capable of interpreting speech commands. Further, the speech recognition hardware platform 105 can be distributed across a network, i.e. the input device 110 can be in different location than other components of the speech recognition hardware platform 105.

The speech recognition hardware platform 105 can include the input device 110 with an associated input controller 115. The input controller 115 can be a processing engine capable of adjusting one or more settings, such as a microphone sensitivity adjustment, resulting in an optimization of signal-to-noise-ratio (SNR) and/or total harmonic distortion (THD), often measured as THD plus noise (THD+N). The input controller 115 can record and adjust a variety of software parameters in relation to audio input. For example, parameters of an adaptive noise reduction algorithm (ANR) that includes at least one configurable variable can be adjusted by the input controller 115. In another example, the input device 110 can consist of multiple-elements with software algorithms controlling each element's input contribution. For instance, the input device 110 can be a multi-element microphone array with beam forming software. In such an example, the input controller 115 can adjust software settings for beam angle, beam forming, and noise reductions settings to optimize the audio input.

The speech recognition hardware platform 105 can also include an optimization processor 120 containing optimization algorithms and/or parameters. In one embodiment, the optimization processor 120 can include a selection of controller parameters for different operating environments and conditions. In another embodiment, the optimization processor 120 can include SNR and THD+N reduction algorithms and heuristics. Additionally, the speech recognition hardware platform 105 can include a speech recognition application 125, which can range from an application that accepts free form speech to an application that matches speech input to a predefined list of understood commands.

Tested system data 130 can be conveyed between the speech recognition hardware platform 105 and the testing device 135. The tested system data 120 can include input device 110 capabilities, optimization parameters/algorithms, sample source waveforms, and the like. For example, if the speech recognition hardware platform 105 includes a computing device with microphone, sound card, and sound drivers, the sound driver parameters and other input characteristics for the speech recognition hardware platform 105 can be contained within the tested system data 130.

The testing device 135 can test the effectiveness of the system data 130 and assist in constructing optimized parameters and algorithms for filtering speech recognition input. The testing device 135 can include hardware, software, and firmware components. Additionally, the testing device 135 can be implemented in a variety of manners. For example, the testing device 135 can be embedded within other hardware/software devices, such as the speech recognition hardware platform 105 or a software design tool. Further, the testing device 135 can be integrated centrally or distributed across a network. The testing device can include a presentation device 165 and an optimization application 140.

The presentation device 165 can be any device capable of presenting testing data to a user, such as a display screen or a printer. Within system 100, optimization application 140 can be a stand-alone software application or a component within another software application. For instance, the optimization application 140 can be an independent application or can be a plug-in used in conjunction with a sound editing program and/or the speech recognition application 125. The optimization application 140 can include a signal editor 145, a debugger 150, a waveform store 155, and an algorithm store 160 all communicatively linked to one another through a network 152.

The signal editor 145 can modify a source waveform producing one or more modified waveforms. For example, the signal editor 145 can accept a source waveform containing both speech and ambient noise, apply an algorithm designed to minimize ambient noise, and produce a modified waveform containing speech and an ambient waveform containing ambient noise. The signal editor 145 can also plot optimization parameters or variables used within optimization algorithms against time to produce parameter waveforms and/or algorithm waveforms. The waveforms within the optimization application 140 can be synchronized with one another, so that optimization attempts can be examined in detail and optimization parameters and variables refined accordingly. Waveforms used within the optimization application 140 can be recorded in a waveform store 155. In one embodiment, exemplary source waveforms and associated model waveforms can be stored within the waveform store 155. In such an embodiment, comparisons can be made between a modified waveform produced by the signal editor 145 and a model waveform 155. Such comparisons can be helpful in properly adjusting optimization parameters and/or optimization algorithms.

The debugger 150 can optionally be included within the optimization application 140 and can be used to examine variables used within optimization code. A unique feature of debugger 150 is the ability to synchronize with the waveforms of the signal editor 145. For example, a segment of a source waveform can be selected and a window for the debugger 150 can be displayed showing an optimization algorithm code section complete with variable values that were applied to the selected segment of the source waveform. The algorithms store 160 can store optimization algorithm and parameter values as well as time annotations necessary to synchronize the optimization algorithm and parameter values with associated waveforms.

Figure 2:
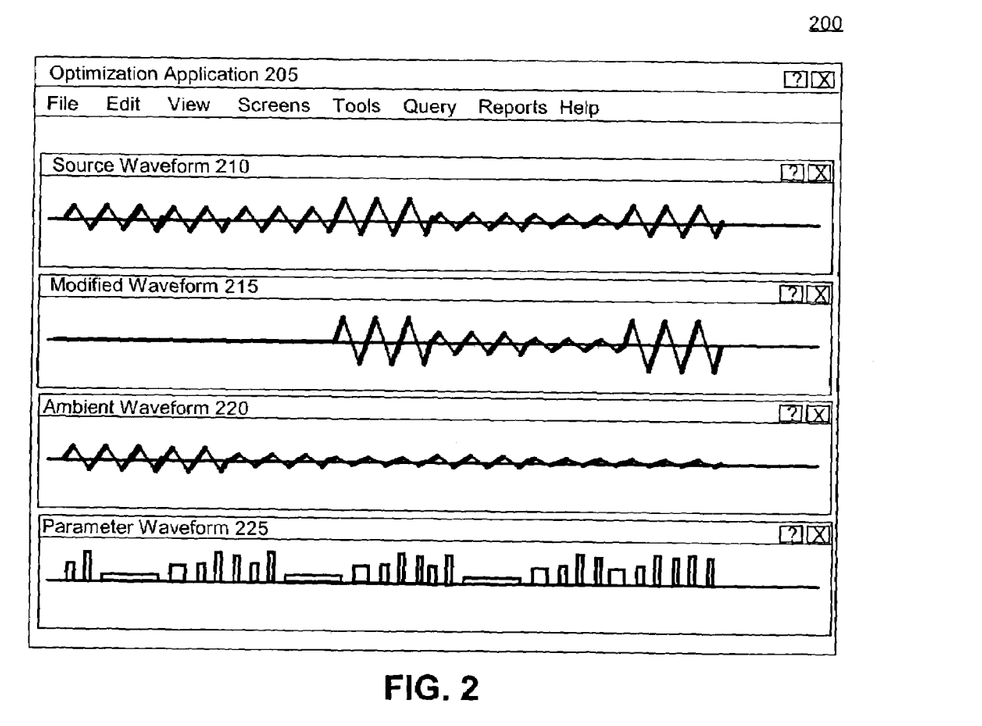
FIG. 2 is an exemplary view of a graphical user interface of an optimization application in accordance with the system of FIG. 1.

FIG. 2 is an exemplary view 200 of an optimization application 205 in accordance with the system of FIG. 1. The optimization application 205 can simultaneously display multiple views, each view corresponding to a signal characteristic and/or a signal component. The optimization application 205 can assist in determining which source waveform 210 components represent speech verses ambient noise, based upon selected optimization algorithms and optimization parameter values. As shown, the optimization application 205 can include, but is not limited to, the source waveform 210 view, a modified waveform 215 view, an ambient waveform 220 view, and a parameter waveform 225 view. The source waveform 210 view can visually represent an unprocessed audio input, such as an input representing unprocessed audio that includes speech.

The modified waveform 215 can represent a processed signal that is believed to contain speech. Thus, the modified waveform 215 can be the resulting waveform achieved by applying at least one optimization parameter/algorithm to the source waveform 210. In contrast, the ambient waveform 220 can represent a processed signal that is believed to contain ambient noise; thus, the ambient waveform can be the filtered waveform that has been removed from the source waveform 210. Accordingly, the source waveform 210 is the sum of the modified waveform 215 and the ambient waveform 220.

The parameter waveform 225 view can include a graph of one or more parameter values plotted against time. In one embodiment, these changes can be recorded as a waveform synchronized with the source waveform 210, modified waveform 215, and ambient waveform 220. Representing parameter values and other optimization telemetry data as waveforms is an efficient mechanism to synchronize such values with audio waveforms. Telemetry data can include data for any variable, such as algorithm variables or optimization parameter variables, associated with modifying the source waveform 210. Notably, a waveform representation of such values can allow the optimization application 205 to leverage programs and libraries developed for manipulating digital audio files. Parameters represented within the parameter waveform 225 view, however, need not be stored as a waveform. In one embodiment, for example, the parameter waveform 225 view can be a graph generated from a recorded table including parameter values recorded at various time segments. Each of these time segments can correspond to a time segment of the source waveform 210.

In operation, a user of the optimization application 205 can select the source 210 waveform from among a list of stored waveforms. Alternately, a user of the optimization application 205 can trigger an input device to record an audio sample to be used as the source waveform 210. Once selected, the user can specify one or more optimization parameters, such as an optimization parameter that establishes a dynamic noise floor threshold. It should be appreciated by one of ordinary skill in the art that audio optimization for automatic speech involves optimization of SNR and/or THD+N. Optimization algorithms can include numerous adjustable settings that can be used to optimize performance under a given set of conditions. The optimization application 205 can alter any of these adjustable settings. The modified waveform 215 and the ambient waveform 220 can result from the application of the selected optimization parameters. For example, the modified waveform 215 can contain all source waveform 210 components above an established dynamic noise floor and the ambient waveform 220 can contain all components below the dynamic noise floor.

The graphical user interface (GUI) shown in FIG. 2 is for illustrative purposes only and other GUI features not explicitly shown are contemplated. For example, each view of the GUI can contain numerical values for signal conditions, a color coding scheme for emphasizing aspects of a graph, as well as other such annotations. For example, in one embodiment, a user of the optimization application 205 can interactively alter a displayed waveform within the optimization application 205 resulting in appropriate adjustments occurring within associated views. For instance, increasing an optimization parameter for gain by modifying the parameter waveform 225 with a mouse can result in adjustments to the modified waveform 215 and the ambient waveform 225. In a further embodiment, an unmodified waveform can be displayed in one color and an interactively modified waveform can be displayed as a different color.

Moreover, pop-up windows can be integrated into the various views. For example, a pop-up window can display underlying parameter and signal values associated with a selected waveform section. In a particular embodiment, a debugging pop-up view can be displayed that allows numerical values to be tracked and operational code behavior to be detected. Additionally, features allowing audio waveforms to be played can be included within each view of the GUI. Furthermore, navigational buttons can be included within the GUI that allow for the simultaneous and/or individual adjustment of displayed waveforms with respect to time.

It should be noted that, the views shown in FIG. 2 are representative of some possible views and are not intended to be exhaustive. Other views are contemplated. For example, a model waveform view can be displayed to demonstrate a waveform that is believed to be optimally modified. In another example, alternative parameter settings and resulting output signals can be displayed. A view containing suggested optimization parameter adjustments can also be included in particular embodiments. In addition to containing other views representing different content, the look and feel of the GUI can vary substantially from embodiment to embodiment depending on aesthetic choices and the capabilities and limitations of supporting hardware.

Figure 3:
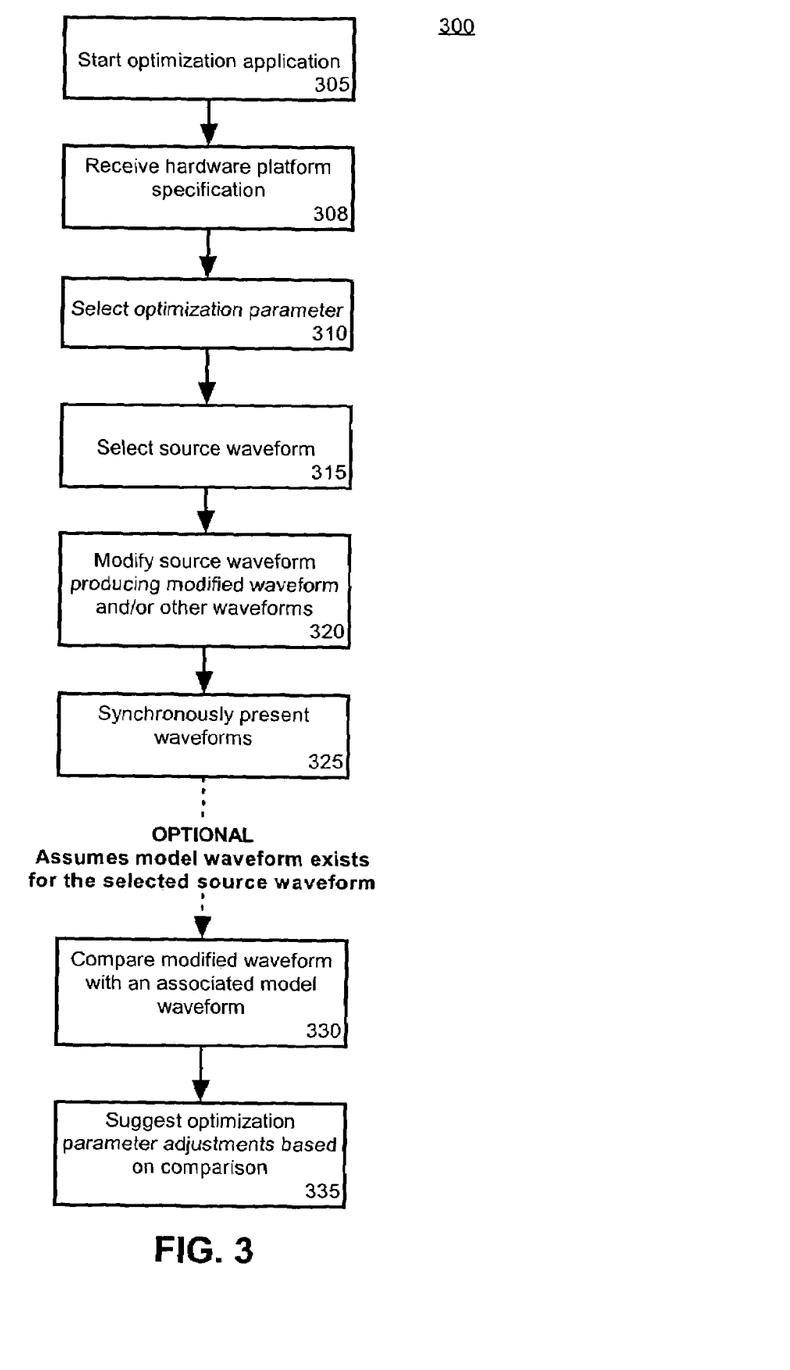
FIG. 3 is a flow chart illustrating a method of adjusting optimization parameters for enhancing speech input of a speech recognition application using the system of FIG. 1.

FIG. 3 is a flow chart illustrating a method 300 of adjusting optimization parameters for enhancing speech input of a speech recognition application using the system of FIG. 1. The method 300 can be used to evaluate the effectiveness of optimization parameters used to pre-filter input for a speech recognition application. The method 300 can begin in step 305, where an optimization application can be started. In step 308, optimization parameters/algorithms and hardware platform data can be received. For example, the sound drivers detailing the capabilities of a particular input device can be received. Additionally, optimization algorithms, such as a matched filter equalization algorithm for minimizing channel reverberation effects, can be conveyed.

In step 310, optimization parameters/algorithms can be selected. In one embodiment, a series of default optimization parameters can exist for various operating conditions. A user can select appropriate ones of the optimization parameters to be used as a baseline for input pre-filtering for predefined environments. In a further embodiment, the initial baseline can be more finely adjusted for a particular environment or application. For example, one optimization selection can represent a moderately noisy office environment, while another can represent the acoustic environment of an airport. Moreover, in one embodiment, different optimization parameters and/or optimization selections can cause different optimization algorithms to be used. For instance, an algorithm for detecting and filtering background telephone rings can be selectively utilized depending upon chosen optimization parameters and/or optimization selections.

In step 315, a source waveform can be selected. The source waveform can be either selected from a list of stored files or constructed using an input device. The input device can reside within the speech recognition hardware platform or can simulate operational conditions of the tested hardware platform. When the source waveform is selected from a file, the source waveform can have an associated model waveform that can be compared to a modified waveform. Notably, in one embodiment, the optimization parameters of step 310 can be automatically selected based upon an analysis of selected source waveforms. For example, a selected source waveform can be analyzed as being extracted from a moderately noisy environment. Based on this analysis, optimization parameters for a moderately noisy environment can be utilized.

In step 320, the selected source waveform can be modified, producing a modified waveform and one or more resulting waveforms, such as an ambient waveform representing the components filtered from the source waveform. In this step, various optimization parameter values and optimization algorithm values, collectively referred to as telemetry data, can be converted into waveforms, wherein each waveform is a value set plotted against time. In step 325, waveforms can be synchronously presented to a user. In one embodiment, such a presentation can include a printing of charts, graphs, and tables representative of the waveforms and telemetry data. In another embodiment, a GUI, such as a sound editing GUI, can be used to display synchronized waveforms. Additionally, underlying variable values used within optimization algorithms can be displayed. For example, an audio debugging tool can be included within the method 300. The debugging tool can be used to analyze underlying optimization algorithms and critique the operational values of algorithm variables.

If a source waveform was selected in step 315 that has a model waveform associated with it, the method can proceed to step 330. In step 330, the modified waveform can be compared with a model waveform. For example, both the model waveform and the modified waveform can be simultaneously displayed upon a single graph in different colors. In step 335, the method can suggest optimization parameter adjustments. For example, when the waveforms are simultaneously displayed, annotations can be included that detail adjustments necessary to reconcile the two waveforms. In a further embodiment, a user can be presented with an option to selectively apply suggested adjustments to current optimization settings.

Figure 4:
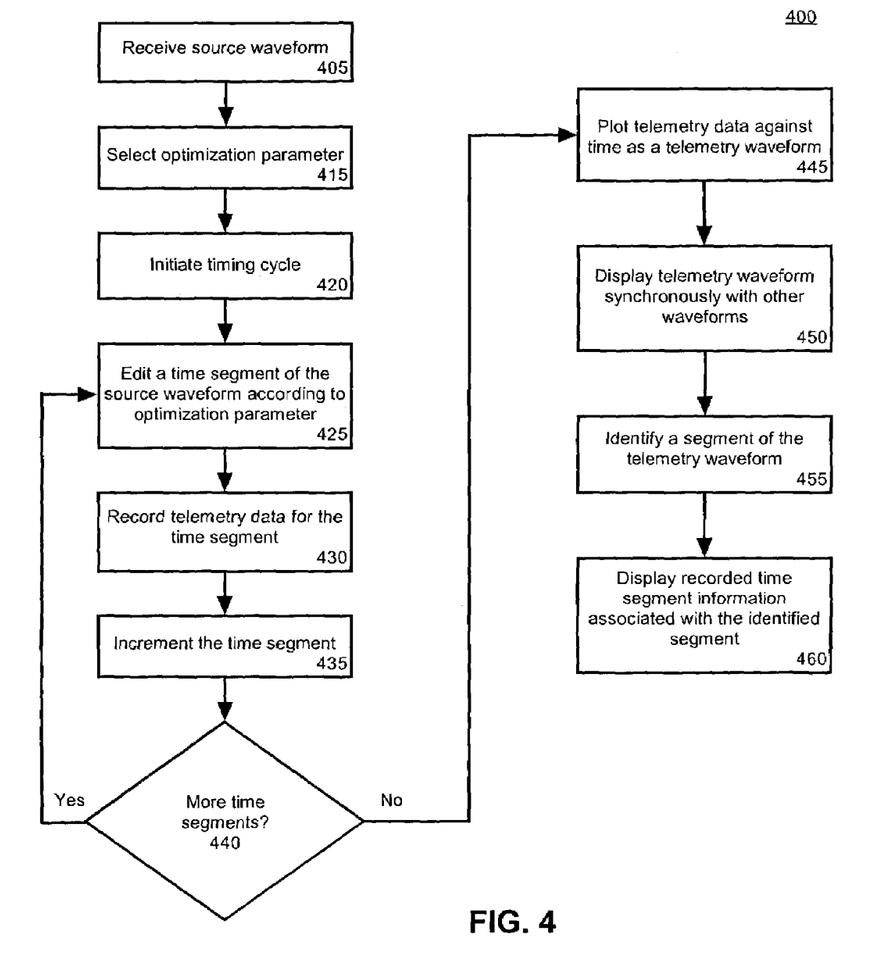
FIG. 4 is a flow chart illustrating a method of editing an audio signal within an optimization application using the system of FIG. 1.

FIG. 4 is a flow chart illustrating a method 400 of editing an audio signal within an optimization application using the system of FIG. 1 so that telemetry data can be synchronously gathered. The method 400 can begin in step 405 where a source waveform can be received. In step 415, one or more optimization parameters can be selected by a user. In step 420, a timing cycle can be initiated. This timing cycle can be used to later synchronize waveforms with recorded telemetry data. For example, a timing cycle can be initiated wherein the source waveform is segmented into time segments, such as a tenth of a second. A table can be constructed for a particular telemetry variable with one column recording a time segment identifier and a second column recording the value of the telemetry variable at that time segment. The table can have a number of rows, each representing a tenth of a second, corresponding to the duration of the source waveform.

In step 425, an individual time segment of the digital input signal can be automatically modified according to optimization parameters selected in step 415. In step 430, telemetry data can be recorded for the time segment. In step 435, the time segment can be incremented. In step 440, if additional time segments need to be processed, then the method can proceed to step 425. If no unprocessed time segments remain, then the method can proceed to step 445. In step 445, recorded telemetry data can be plotted against time to produce a telemetry waveform, which can be displayed and/or stored. In step 450, a produced telemetry waveform can be displayed synchronously with other waveforms. In step 455, a user can select a segment of a displayed waveform. In step 460, telemetry information associated with the selected segment can be displayed. For example, telemetry data can appear within a pop-up window. Alternately, a debugging tool that shows optimization code and variable values for the selected time segment can be displayed.

It should be noted that by segmenting the processing of method 400 into discrete segments the method can be performed by a low-resource hardware platform. Instead of requiring hardware resources capable of performing real-time comparisons, telemetry data can be synchronized with waveforms and stored. In this manner, even if a hardware platform is incapable of real-time or near real time computations, waveforms and telemetry data can be displayed in a simultaneous fashion. For example, method 400 can be performed within a personal data assistant containing a small amount of random access memory, processing ability, and a modest amount of storage for recording results. Alternatively, high resource platforms can simultaneously processes multiple time segments resulting in extremely fast processing. Since time-segment related information is recorded and retained, users of method 400 can extensively examine editing details that occur during method 400, extracting data from many synchronized sources.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of optimizing audio input for speech recognition applications comprising the steps of:
    identifying a source waveform;
    identifying at least one optimization parameter, wherein said optimization parameter is configured to adjust audio input to a speech recognition application;
    applying an optimization algorithm executed by a signal editor, said optimization algorithm being preconfigured to modify said source waveform according to said optimization parameter, resulting in a modified waveform;
    synchronizing said optimization algorithm and at least one optimization parameter with said source waveform;
    displaying a graph for said at least one optimization parameter while also displaying at least one of said source waveform and said modified waveform;
    displaying said at least one optimization parameter and at least a portion of said optimization algorithm with time annotations for synchronizing the algorithm and at least one optimization parameter with the waveforms, wherein displaying synchronously said graph of said at least one optimization parameter with at least one of said source waveform and said modified waveform reveals an optimizing value of the at least one optimization parameter; and
    setting at least one adjustable input parameter of an audio input device based upon the optimization value for enhancing the speech recognition capabilities of a speech recognition application, wherein said audio input device is configured to receive audio input for a speech recognition application.

2. The method of claim 1, wherein said displaying step occurs within a graphical user interface, said method further comprising the step of:
    adjusting the time span of at least one of said time dependant graphs responsive to an input from a user of said graphical user interface.

3. The method of claim 1, further comprising the step of:
    altering said optimization parameter responsive to said displaying step.

4. The method of claim 3, wherein said altering step further comprises the step of:
    modifying said source waveform according to said altered optimization parameter resulting in a new modified waveform.

5. The method of claim 1, further comprising the steps of:
    identifying a model waveform;
    calculating a difference between said modified waveform and said model waveform; and,
    determining at least one parameter which is responsible for at least part of said difference.

6. The method of claim 1, wherein said modifying step further comprises the step of:
    generating an ambient waveform, wherein said ambient waveform is the difference between said source waveform minus said modified waveform.

7. The method of claim 1,
    wherein said algorithm comprises at least one algorithm variable, and wherein said displaying further comprises displaying a graph for said at least one algorithm variable plotted against time.

8. The method of claim 7, wherein said method further comprises the step of:
    displaying a debugging window for tracing values of at least one of said algorithm variables through source code execution.

9. The method of claim 8, wherein said debugging window is synchronized with said graphs displayed in claim 1.

10. A system for optimizing input for speech recognition applications comprising:
    an audio input device containing at least one adjustable input parameter, wherein said audio input device is configured to receive audio input for a speech recognition application;
    a signal editor configured to modify a source waveform by said at least one adjustable input parameter producing a modified waveform, said signal editor producing said modified waveform by modifying said source waveform based upon an optimization algorithm executed by said signal editor;

a means for converting each adjustable input parameter into a parameter waveform, wherein said parameter waveform is a graphical representation of the value of one or more selected input parameters plotted against time and synchronized with said source waveform and said modified waveform;

a means for simultaneously displayings aid parameter waveform, said source waveform, said modified waveform, and at least a portion of said optimization algorithm along with time annotations for synchronizing the optimization algorithm and at least one of the waveforms, the synchronous displaying of said parameter waveform, said source waveform, and said modified waveform reveals an optimizing value of the at least one optimization parameter; and a means for setting at least one adjustable input parameter of said audio input device based upon the optimization value for enhancing the speech recognition capabilities of a speech recognition application.

11. The system of claim 10, wherein said signal editor is configured to generate an ambient wavefonn, wherein said ambient waveform is the difference between said source waveform minus said modified waveform, wherein said displaying means is configured to display said ambient waveform.

12. The system of claim 10, wherein said optimization algorithm comprises at least one algorithm variable, and wherein said system further comprises:

a means for converting at least one of said algorithm variables into an algorithm waveform, wherein said algorithm waveform is a mathematical representation of the value of a selected one of said algorithm variables plotted against time, wherein said algorithm waveform is synchronized with said source waveform, wherein said displaying means is configured to display said algorithm waveform.

13. The system of claim 10, wherein said displaying means comprises a sound editing software application.

14. The system of claim 10, wherein said optimization parameter optimizes said source waveform for at least one of total-harmonic-distortion-and-noise and signal-to-noise-ratio.

* * * * *